United States Patent
Laporte

(10) Patent No.: US 7,866,006 B2
(45) Date of Patent: *Jan. 11, 2011

(54) CABLE TIE HAVING DETACHABLE TAIL

(75) Inventor: Richard Laporte, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/402,533

(22) Filed: Mar. 12, 2009

(65) Prior Publication Data

US 2009/0172922 A1    Jul. 9, 2009

Related U.S. Application Data

(63) Continuation of application No. 11/493,195, filed on Jul. 26, 2006, now Pat. No. 7,520,030.

(51) Int. Cl.
*B65D 63/10* (2006.01)
(52) U.S. Cl. .................................................. 24/16 PB
(58) Field of Classification Search ............... 24/16 PB, 24/30.5 P, 16 R, 17 A, 17 AP, 30.5 R, 17 B; 248/74.3; 292/318, 321, 325
See application file for complete search history.

(56) References Cited

U.S. PATENT DOCUMENTS

| | | |
|---|---|---|
| 1,086,442 A | 2/1914 | Cornelius |
| 1,810,027 A | 6/1931 | Moran et al. |
| 3,102,311 A | 9/1963 | Martin et al. |
| 3,224,054 A | 12/1965 | Lige |
| 3,416,198 A | 12/1968 | Geisinger |
| 3,438,095 A | 4/1969 | Evans |
| 3,486,200 A | 12/1969 | Orenick |
| 3,672,003 A | 6/1972 | Morgan |
| 3,739,430 A | 6/1973 | Kohke |
| 3,913,179 A | 10/1975 | Rhee |
| 4,039,078 A | 8/1977 | Bone |
| 4,214,349 A | 7/1980 | Munch |
| 4,441,233 A | 4/1984 | Swift |
| 4,466,159 A | 8/1984 | Burrage |
| 5,414,903 A | 5/1995 | Porteous |
| 5,441,316 A | 8/1995 | Georgopoulos |
| 5,463,799 A | 11/1995 | Graham |
| 5,533,767 A | 7/1996 | Georgopoulos et al. |
| 5,636,412 A | 6/1997 | Lodi et al. |
| 5,704,097 A | 1/1998 | Rahav |
| 5,881,435 A | 3/1999 | Jermyn, Jr. |

(Continued)

FOREIGN PATENT DOCUMENTS

DE    199 54 307    12/2000

(Continued)

*Primary Examiner*—James R Brittain
(74) *Attorney, Agent, or Firm*—Hoffmann & Baron, LLP

(57) ABSTRACT

A one-piece cable tie includes a tail which is configured with a plurality of slits or notches therein. These slits are in alignment with the recesses in the tail and extend no deeper than the depth of the recesses. Such slits are designed to aid the use in removing the excess tail from the cable tie once the tie has been tensioned around a bundle. The user first bends the tail so as to close the slits in one side of the tie and then twists the tie about its longitudinal axis so as to separate the excess tail from the tie.

5 Claims, 6 Drawing Sheets

U.S. PATENT DOCUMENTS

| | | |
|---|---|---|
| 6,240,606 B1 | 6/2001 | Hiroki |
| 7,360,281 B1 | 4/2008 | MacCartey et al. |
| 2006/0096066 A1 | 5/2006 | Wambaugh et al. |

FOREIGN PATENT DOCUMENTS

| | | |
|---|---|---|
| FR | 2781257 | 7/1998 |
| GB | 1290773 | 9/1972 |
| WO | WO 97/16359 | 5/1997 |

CABLE TIE HAVING DETACHABLE TAIL

CROSS-REFERENCE TO RELATED APPLICATIONS

This application is a continuation of U.S. application Ser. No. 11/493,195, filed Jul. 26, 2006, which claims priority to U.S. Provisional Application No. 60/706,404, filed Aug. 8, 2005, which are incorporated herein by reference.

FIELD OF THE INVENTION

The present invention relates generally to cable ties for bundling one or more cables or the like. More particularly, the present invention relates to integrally formed one-piece cable ties which permit the removal of the tail of the tie once bundled.

BACKGROUND OF THE INVENTION

Cable ties have long been used to bundle one or more articles such as cables and the like. These ties are typically plastic elongate straps having a tail at one end and a locking head at the other end for receiving the tail. The head includes a locking mechanism in the form of an integrally formed locking pawl (one-piece) or an inserted metallic barb (two-piece).

Both the one-piece and two-piece cable ties operate substantially the same way in that the free end of the tail is looped around the bundle and pushed or pulled through the head so as to engage the pawl or barb therein. The cable tie is then tensioned around the bundle as desired. The pawl or barb engages the tail as it passes through the head and prevents the tail from backing out even under a load. The excess tail then extends outside the head.

While many patents have been issued directed to the shape or construction of the cable tie, its barb or pawl, and/or its head, few address the removal of the excess tail from the cable tie once the tie has been installed. Instead, the user is left to his/her own devices such as employing a tool to cut the excess length off.

U.S. Pat. No. 3,739,430 is an early attempt at providing some mechanism of removing the excess tail length from the tie after tensioning. In accordance with this patent a series of slits are cut into the opposite shorter sides of the strap at spaced intervals. After the tail is pushed through the head, the tail is twisted about its longitudinal axis as shown in FIGS. 4 and 9 until the tail separates from the tie. While this method enables a user to detach a two-piece cable tie tail without using tools, this method is not suitable for one-piece cable ties. This is because these side slits will significantly reduce the cross-sectional area of the one-piece tie and hence such a side-slitted cable tie cannot attain the same rating as its un-slitted twin.

While this side-slitting method is suitable for two-piece cable ties, such technology is not readily transferable to one piece cable ties. This is because two-piece cable ties generally have a smooth planar tail with no interruptions, ridges or teeth therein since it is intended for the metal barb to bite into the tail at any location along its length. In other words, its cross-sectional area is constant along the length of the tail. In contrast, the tail of one-piece cable ties are specially designed with at least one surface (and maybe its opposite surface too) configured with a series of ridges or teeth therein that are intended to be engaged (not embedded) by the pawl. Hence, the cross-sectional area of the tail of a one-piece cable tie varies depending on whether the view is through a tooth or the space between adjacent teeth. Thus, the placement of side slits as shown in the '430 patent will compromise the strength of a one-piece cable tie if the slits align with the recess between the teeth. This is because the slit would further erode the load-bearing cross-sectional area of the tie thereby rendering it only marginally useful.

SUMMARY OF THE INVENTION

It is thus an object of this invention to provide a one-piece cable tie where the excess tail length can be removed by a user without the need for tools or knives.

It is a further object of this invention to provide a one-piece cable tie whose excess tail length can be removed by the simple act of twisting or bending.

A further object of this invention is to provide a one-piece cable tie designed so that its excess tail length can be removed without adversely affecting the strength of the cable tie when under tension.

A one-piece cable tie includes a head, a strap extending from the head and a tail forming at least a portion of the strap, this tail being configured with a plurality of spaced teeth and spaced recesses in at least a first surface thereof. The cable tie is also configured with a first plurality of spaced slits in the first surface which are in alignment with the spaced recesses. The cable tie is also configured with a second plurality of spaced slits in a second surface of the tail opposite this first surface.

In one version of the cable tie, the first plurality of spaced slits extend no deeper than the depth of the recesses. In another version of the cable tie, the first and second plurality of spaced slits are in alignment with each other. In yet another version of the cable tie, there are opposite side surfaces intermediate the first and second surfaces and the tie is configured wherein a mid-portion of the tail extends fully from one side surface to the other without any slits therein along the length of the tail.

DETAILED DESCRIPTION OF THE PREFERRED EMBODIMENT

Figure 1:
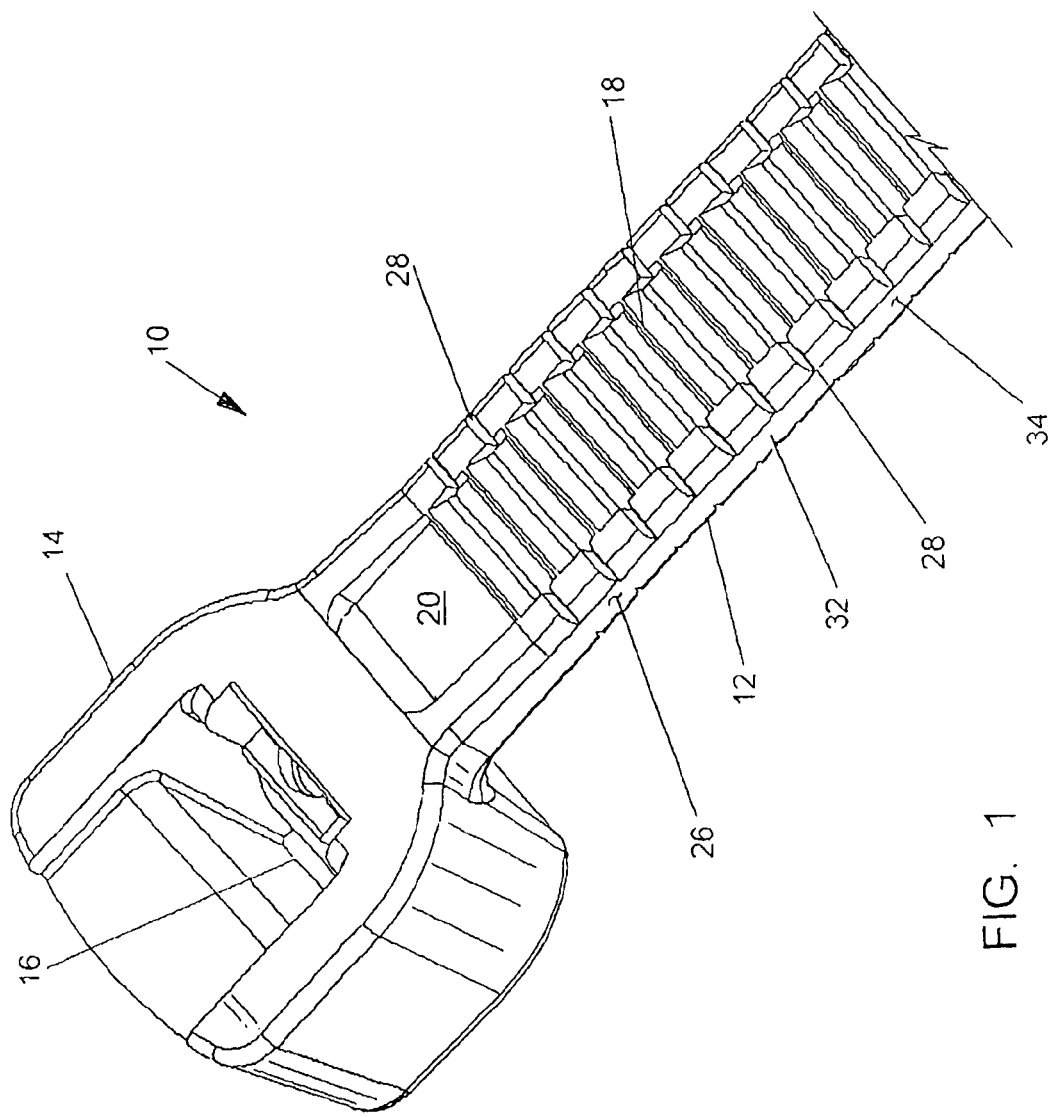
FIG. 1 is a rear perspective view of the cable tie of the present invention.

Referring to the drawings, there is shown one-piece cable tie 10 having a tail 12 forming all or a part of an elongated strap, a head 14 and a flexible pawl 16 all generally made of a suitable plastic material and generally manufactured by an integral molding process.

Figure 2:
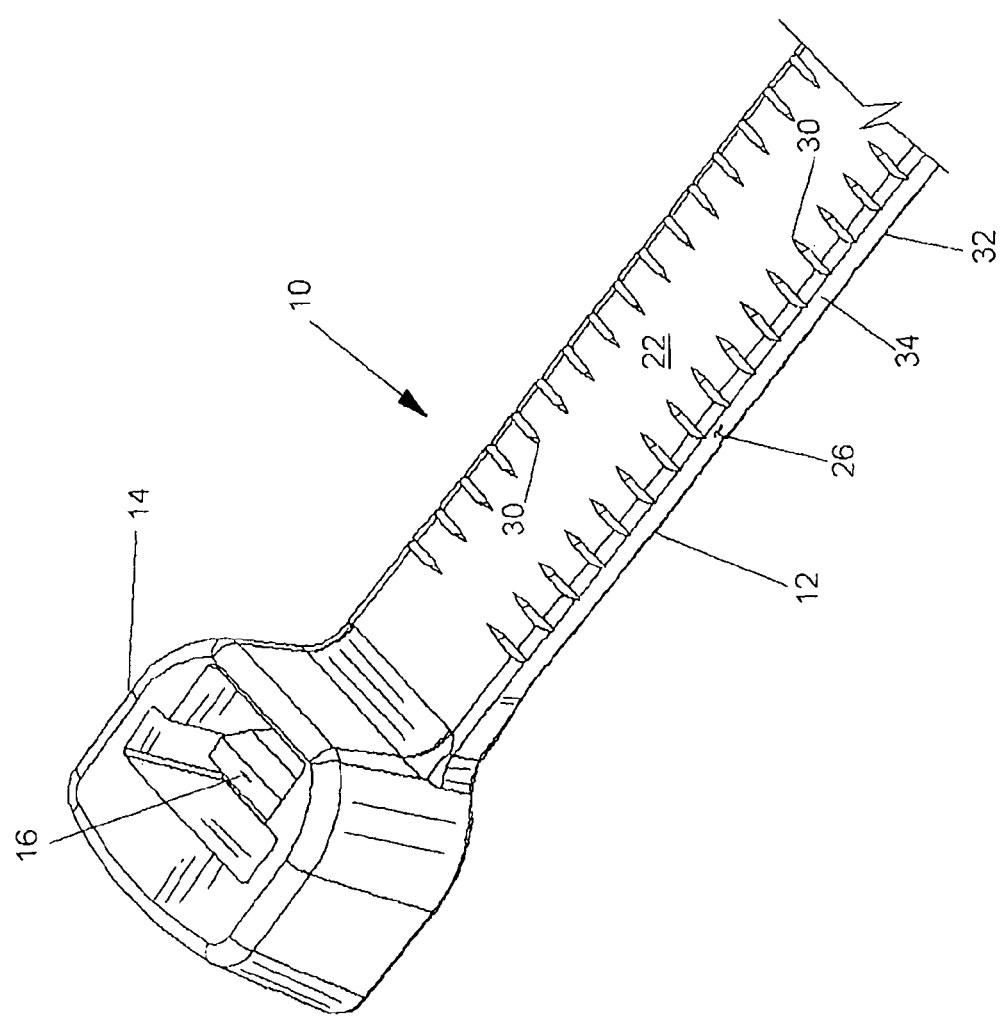
FIG. 2 is a front perspective view of the cable tie of the type shown in FIG. 1.
Figure 3:
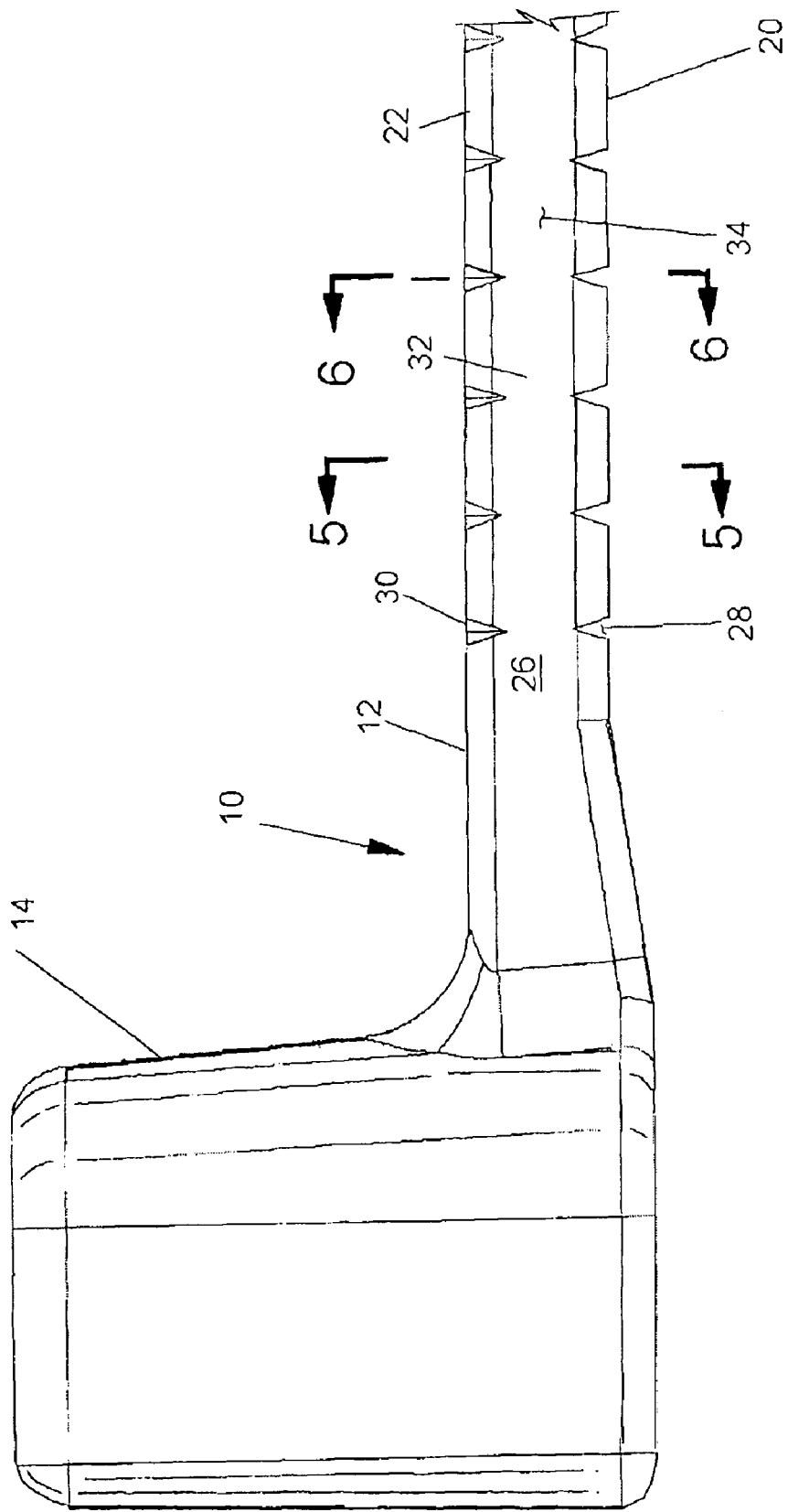
FIG. 3 is a side elevational view of the cable tie of FIG. 2.

The parallel teeth 18 that run along a bottom surface 20 of tail 12 while FIG. 2 illustrates the generally smooth planar top surface 22 of cable tie 10. While such is the preferred embodiment, both sides of tail 12 could be configured with teeth 18 therein if desired.

Teeth 18 and pawl 16 of this embodiment are specially designed for one-way ratchet-type inter-engagement in order to keep cable tie 10 securely bundled or tensioned about cables and the like as is well known in the art.

The strap includes recesses 24 intermediate teeth 18. The recesses 24 are evenly spaced and permit a portion of pawl 16 to fit therein and engage one or more surfaces of teeth 18 so as to prevent tail 12 from being pulled back out of head 14.

Running the length of tail 12 alongside both teeth 18 and recesses 24 are exterior rails 26. Rails 26 help align pawl 16 with teeth 18 and they also aid in the insertion of tail 12 within head 14 as they provide stiffness to tail 12. The tail of the one-piece cable tie 10 is a continuous piece of uniformly shaped material, but with the tail 12 having uniform recesses 24 formed therein to approximate a "scooped out" configuration of at least bottom surface 20 intermediate rails 26.

The present invention provides for severing the excess tail length from a tensioned tie is without using cutters or knives or the like.

Figure 4:
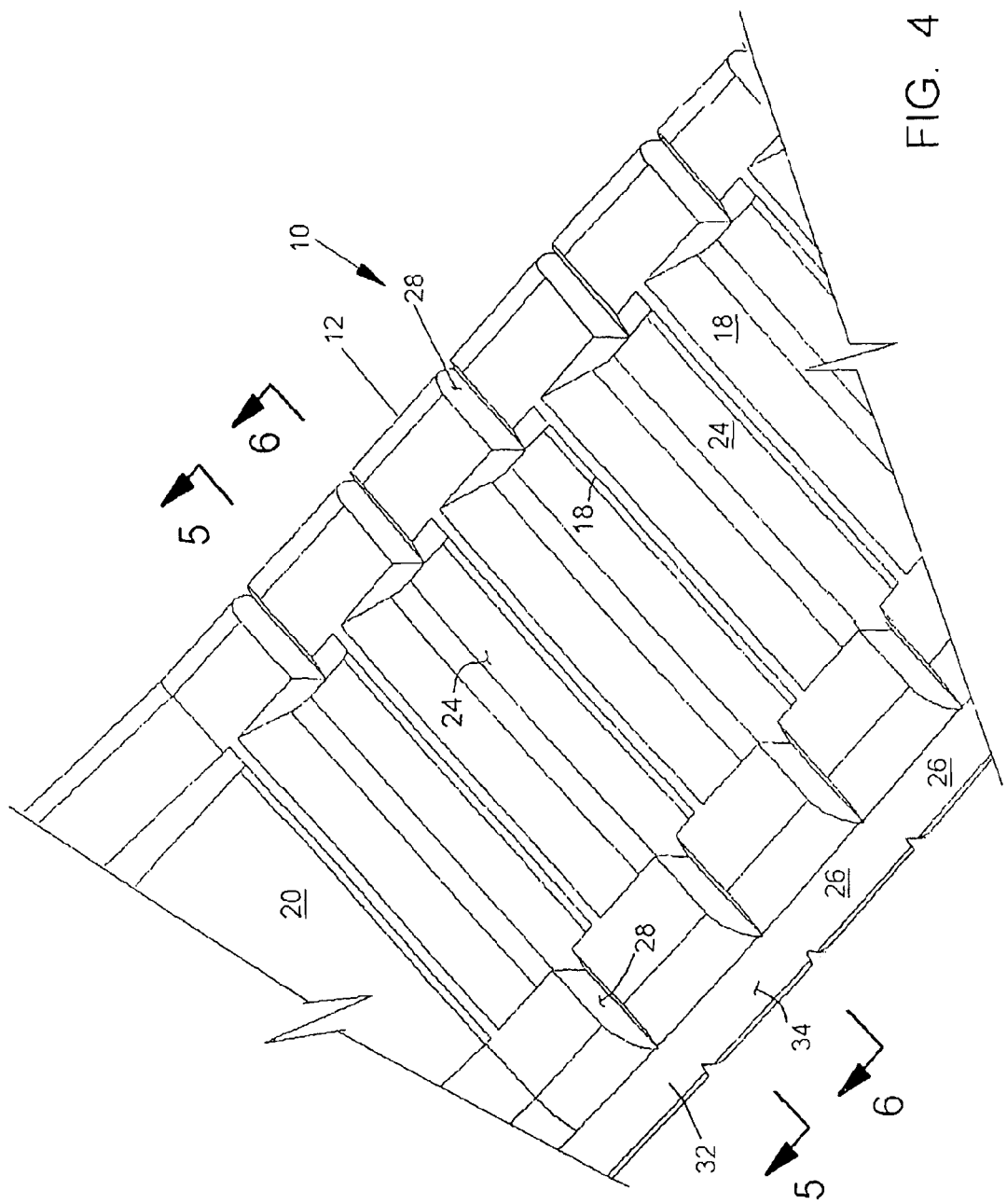
FIG. 4 is a rear perspective view of a portion of the cable tie strap of FIG. 1.

In the present embodiment, a series of spaced notches or slits 28 are formed into bottom surface 20 of tie 10. A like series of slits 30 are found in the top surface 22 of tie 10. Bottom surface slits 28 extend only to the depth of recess 24 as shown in FIG. 4. This is the maximum depth of slits 28. The slits 28 may be shallower in the recess 24. Top surface slits 30 are not so confined. The slits 28 and 30 have a depth such that the strength of the cable tie is not adversely affected which could render it inadequate or too weak to attain its un-slitted rated strength. Also, as can be seen from the drawings, slits 28 and 30 are primarily confined to rails 26 so as not to interfere with teeth 18 of cable tie 10. Further, it should be noted that these slits 28 and 30 are found in the top 22 and bottom 20 surfaces of tail 12 and not its sides. This allows the sides of the tail 12 to remain substantially intact.

Figure 5:
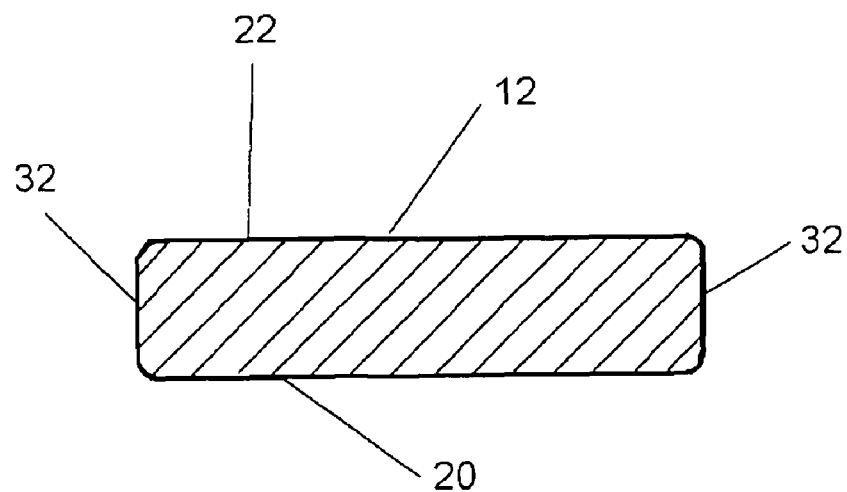
FIG. 5 is a cross-sectional view of the cable tie of FIG. 3 taken along lines 5-5 thereof.
Figure 6:
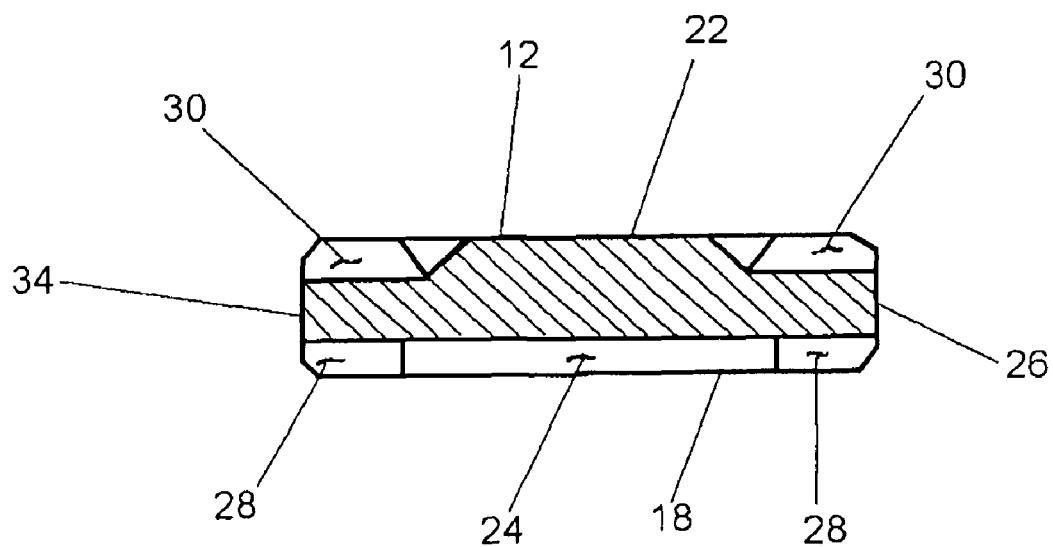
FIG. 6 is a cross-sectional view of the cable tie of FIG. 3 taken along lines 6-6 thereof.

FIG. 5 shows a cross-section through a tooth 18 of the cable tie 10. This is the maximum amount of cross-sectional surface area for tie 10. In contrast, FIG. 6 shows a cross-section through a recess of cable tie 10. This is the minimum amount of cross-sectional surface area for tie 10. FIG. 6 illustrates recess 24, bottom slit 28 and top slit 30. Rails 26 can also be distinguished. The slits 28 and 30 do not meet or are not joined. Moreover, no cutting or notching of rail 26 occurs at the minimum cross-section surface area shown in FIG. 6 as the surface area must still be sufficient enough to withstand the load placed upon cable tie 10. Thus, the slits are provided along the cable tie, without reduction to its rated strength. Hence, while bottom 20 and top 22 surfaces contain slits therein, the adjoining side surfaces 32 remain free of slits. A mid-region 34 of tail 12 extending from one side surface 32 to the other remains un-slitted and hence continuous along its length, this mid-region 34 being illustrated in FIG. 6. Top surface slits 30 have been found desirable so as to help encourage the stress breakage of tail 12.

Figure 7:
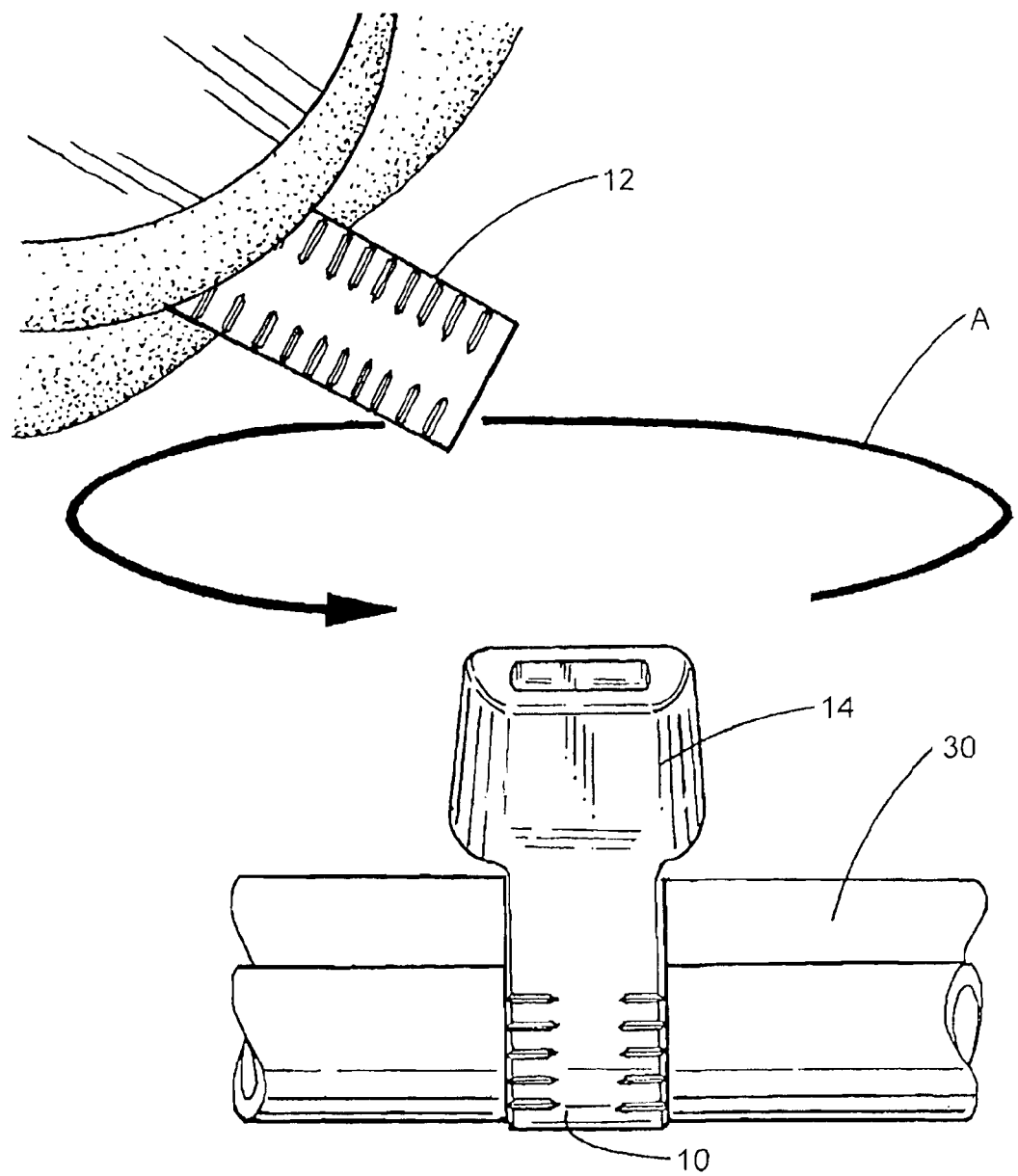
FIG. 7 is a perspective view of the cable tie of the present invention bundled about a cable with the tail shown removed.

Referring now to FIG. 7, in operation, once the cable tie 10 is bundled about cables 30, with the tail extending through head 14, the excess tail 12 length is first bent so as to close-up bottom surface slits 28 and open-up top surface slits 30. The tail 12 is then rotated about its longitudinal axis (say clockwise as indicated by arrow A) until it is separated from the body of the head 14. This creates a frangible location on the cable tie strap which allows the strap to be severed at the head upon said manual twisting. The slits 28 and 30 are positioned at a fixed distance from teeth 18 such that when the tail is severed from the head there is no excess material protruding from the head.

The benefit of top surface slits 30 becomes evident in this bending about the longitudinal axis. It has been found that without slits 30, such longitudinal twisting does not create the desired stresses in top surface 22 whereas with slits 30, the excess tail length is readily removed from tie 10. Bottom slits 28 help overcome the rigidity and strength that rails 26 provide to tail 12 during this removal operation. Further, by incorporating top and bottom slits 28 and 30, rather than side slits, the cable tie 10 is more flexible and hence easier to fit around a bundle. It should also be noted that with slits being configured in both top and bottom surfaces 20 and 22, the tail 12 can be bent and/or twisted in a direction opposite to that described above and still be equally removable.

Various changes to the foregoing described and shown structures would now be evident to those skilled in the art. Accordingly, the particularly disclosed scope of the invention is set forth in the following claims.

What is claimed is:

1. A one-piece cable tie comprising:
   an elongated tail extending from a head,
   said tail configured with a plurality of spaced teeth and spaced recesses in at least a first surface thereof,
   said head having an integrally formed locking pawl having a portion thereof for fitting within said recesses for locking engagement with said tail teeth; and
   a first plurality of spaced slits in said first surface extending no deeper than the depth of said recesses, said slits being in alignment with said spaced recesses and defining a frangible location for severing a portion of said tail thereat upon insertable accommodation of said tail in said head.

2. The one-piece cable tie as set forth in claim 1 further comprising a second plurality of spaced slits in a second surface of said tail opposite said first surface.

3. The one-piece cable tie as set forth in claim 2 wherein said first and second plurality of spaced slits are in alignment with each other.

4. The one-piece cable tie as set forth in claim 1 further comprising opposite side surfaces intermediate said first and second surfaces and wherein a mid-portion of said tail extending fully from one side surface to the other is unslitted along the length of said tail.

5. A one-piece cable tie of claim 1 wherein said slits are spaced from said teeth a given distance such that severing said tail at said slits results in the severed end of the tail being substantially flush with the head.

* * * * *